Dec. 22, 1964 O. J. MURPHY 3,162,818
SYMMETRICALLY LIMITING AMPLIFIER WITH FEEDBACK PATHS RESPONSIVE TO INSTANTANEOUS AND AVERAGE SIGNAL VARIATIONS
Filed Sept. 11, 1961
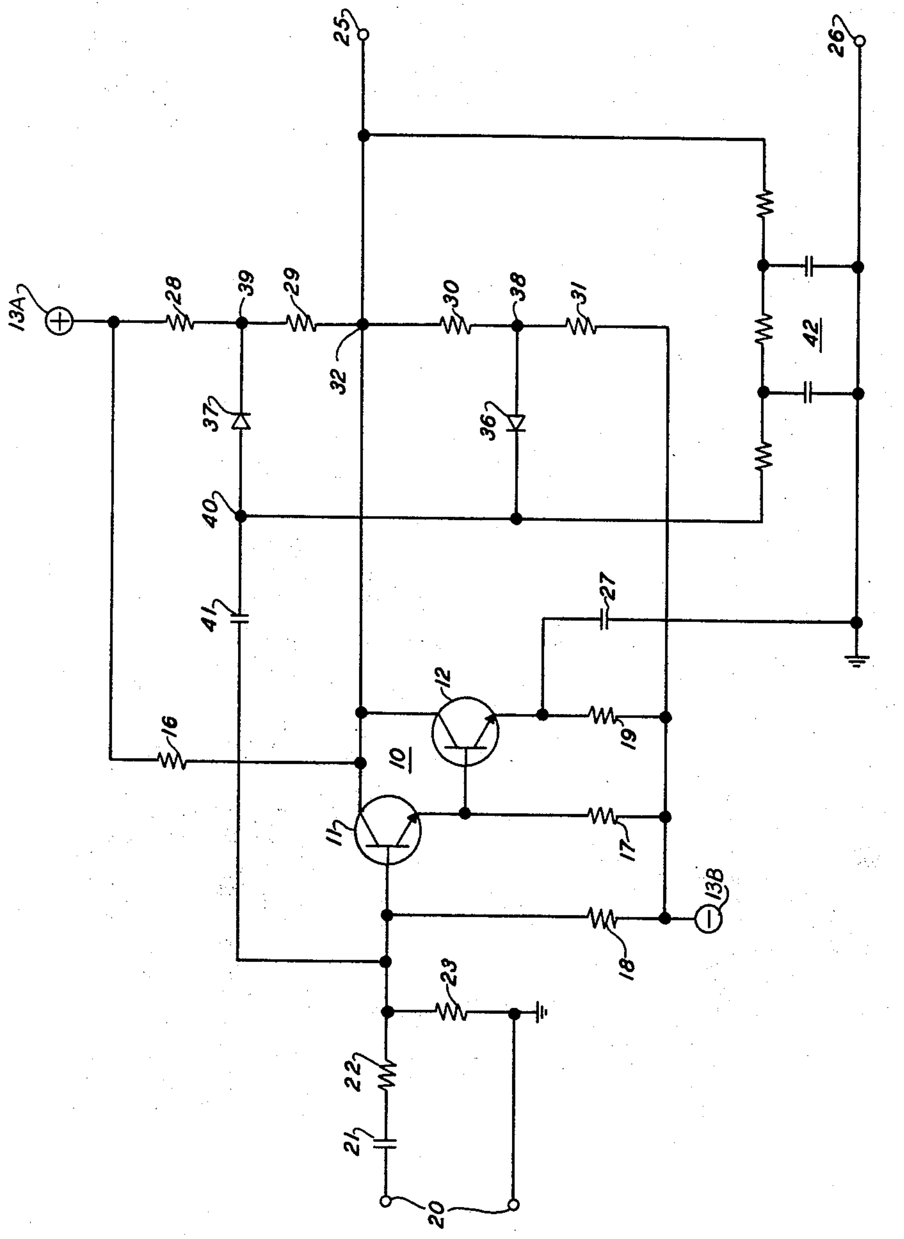
INVENTOR
O. J. MURPHY
BY Charles Scott Phelan
ATTORNEY United States Patent Office 3,162,818

Patented Dec. 22, 1964

3,162,818

SYMMETRICALLY LIMITING AMPLIFIER WITH FEEDBACK PATHS RESPONSIVE TO INSTANTANEOUS AND AVERAGE SIGNAL VARIATIONS

Orlando J. Murphy, New York, N.Y., assignor to Bell Telephone Laboratories, Incorporated, New York, N.Y., a corporation of New York Filed Sept. 11, 1961, Ser. No. 138,221
5 Claims. (Cl. 328—169)

This invention relates to an amplifier for limiting electrical signals, and it is illustrated in connection with an amplifier for symmetrically limiting such signals.

In the field of electric signal limiting it has been found that the problem of symmetrically limiting the positive-going and negative-going excursions of an electric signal wave is fraught with difficulties. One of the difficulties which has been particularly troublesome is that changes take place in the average value of the wave as a result of influences such as ageing of circuit components, changes in ambient temperature, changes in the current output of potential sources, and other similar causes. If the average value of the wave changes, the symmetry of the limited signal is usually lost.

It is, therefore, a principal object of the present invention to accomplish symmetrical limiting of an electric wave in a simple manner and by means which are not subject to the aforementioned difficulties.

Another object is to maintain the symmetry of a limited electric signal in spite of changes in the average value of the signal.

These objects and others are realized in an illustrative embodiment of the invention in which a limiting amplifier employs biased limiting diodes connected in series in a negative feedback circuit. A low-pass filter is connected between an output terminal of the amplifier and a point in the feedback circuit which is separated from the amplifier output terminal by the mentioned diodes.

It is a feature of this arrangement that both terminals of each of the diodes are subjected to any variations which may occur in the average value of the signal as a result of relatively slow changes in the direct-current component of the amplifier output. However, only the terminals of the diodes which are connected to the amplifier output are subjected to instantaneous signal amplitude variations. Thus, the limiting function is performed in a manner which is constant with respect to the average, or direct-current, value of the output signal.

A more complete understanding of the invention and its various objects and advantages may be obtained from a consideration of the single figure of the accompanying drawing taken together with the following detailed description and the appended claims.

In the drawing a compound amplifier 10 provides the needed gain in the circuit and includes two transistors 11 and 12. Operating potential is supplied from a potential source which is schematically represented by terminals comprising the circled plus and minus signs 13A and 13B. A resistor 16 connects source terminal 13A to the collector electrodes of transistors 11 and 12 and a resistor 17 connects source terminal 13B to the emitter electrode of transistor 11 and the base electrode of transistor 12. Resistors 18 and 19 connect the base and emitter electrodes of transistors 11 and 12, respectively, to source terminal 13B. Input signals are applied to the amplifier at terminals 20 and are coupled by a series connected capacitor 21 and resistor 22 across an input resistor 23. One terminal of resistor 23 is connected to the base electrode of transistor 11, while the other terminal is connected to ground. In the illustrated embodiment ground represents a potential level between the levels represented by source terminals 13A and 13B.

Amplifier output signals appear at terminals 25 and 26. Terminal 26 is grounded, and terminal 25 is directly connected to the collector electrode of transistor 12. An alternating current bypass capacitor 27 shunts signal currents to ground from the emitter electrode of transistor 12.

In accordance with the invention, limiting negative feedback connections are provided from the common collector electrodes of transistors 11 and 12. These connections include a potential divider which is connected between source terminals 13A and 13B and which comprises four resistors 28, 29, 30, and 31 connected in series between those terminals. The common terminal 32 between resistors 29 and 30 is connected to output terminal 25, and thus it is also connected to the common collector electrodes of transistors 11 and 12. Two diodes 36 and 37 are connected in series between a terminal 38, which is common to resistors 30 and 31, and a terminal 39, which is common to resistors 28 and 29. Diodes 36 and 37 are poled for conduction in the same direction in that series circuit; and a terminal 40, which is common to both diodes, is connected by means of a capacitor 41 to the base electrode of transistor 11 for completing the feedback connection.

Diodes 36 and 37 are also poled so that they tend to oppose the flow of current through the full extent of their series connections from source terminals 13A and 13B. In the absence of signals from amplifier 10, both diodes are nonconducting. However, amplifier output signal excursions at terminal 32 may raise or lower the potential at that terminal sufficiently to bias either diode 36 or diode 37, respectively, into conduction. Such conduction results in strong negative feedback which reduces amplifier gain to approximately unity and produces flat-topped lobes on the output signal. Appropriate proportioning of resistors 28, 29, 30, and 31 fixes the voltages at which limiting takes place and any desired relationship in the relative amplitudes of limited output signal lobes.

It can be shown in regard to the mentioned proportioning of resistors that when the limiting feedback comes into play the amplifier gain is reduced to a value which is given to a close approximation by the ratio of the value of the parallel combination of the two potential divider resistors connected to the conducting diode, to the value of resistor 22. For symmetrical limiting the potential divider resistors are proportioned to make the two ratios, one for conduction in each diode, equal to one another and approximately equal to unity. Such proportioning will, of course, take into account the source potential at terminals 13A and 13B as well as the average direct potential at terminal 32.

An additional branch of the feedback connection is arranged between the terminals 32 and 40 and includes a low-pass filter circuit 42 which has the common lead thereof connected to ground. Filter 42 is designed to present a relatively high attenuation to electric signals at frequencies which are intended to be transmitted by amplifier 10. For this reason, the filter provides essentially zero negative feedback for those frequencies. Filter 42 is also further designed to present a relatively low attenuation to slow changes in the direct-current component of the signal such as might result from the ageing of circuit devices or from gradual changes in the value of operating potential supplied to the circuit.

It will thus be apparent that the terminals of diodes 36 and 37 which are connected to circuit terminals 38 and 39 are subjected to both the instantaneous signal amplitude variations which appear at terminal 32 and the direct-current component of the signal. On the other hand, however, the electrodes of these diodes which are connected in common to terminal 40 are continuously subjected only to the direct-current component of amplifier output signals and such slow changes therein as are coupled thereto by filter 42. These latter diode electrodes do not receive instantaneous signal amplitude variations except those which may be transmitted through the diodes.

Although this invention has been described in connection with a particular illustrative embodiment, it is to be understood that additional modifications and embodiments which will be obvious to those skilled in the art are included within the spirit and scope of the invention.

What is claimed is:

1. A limiting amplifier circuit comprising an amplifier having input and output connections, a negative feedback circuit coupling signals from said output connections back to said input connections, said feedback circuit comprising in at least a portion thereof two parallel conduction paths, means in series in a first one of said conduction paths transmitting only the direct-current component of said signals and slow variations thereof, means in a second one of said paths transmitting both signal amplitude variations and said direct-current component, and signal amplitude limiting means connected in said second path to be biased for limiting operation by the voltage difference between signals at the input of said second path and the output of said first path.

2. In an amplifier for limiting the amplitudes of signals which are subject to both instantaneous and average signal amplitude variations, input and output circuits for said amplifier, a negative feedback path connecting said input and output circuits, said feedback path including means limiting both positive-going and negative-going signal amplitude excursions, and circuit means connected between said output circuit and a point in said feedback path which is between said amplifier input circuit and said limiting means, said circuit means including an impedance network offering low attenuation to the direct-current component of the signal and high attenuation to instantaneous signal variations.

3. A limiting amplifier network comprising an amplifier circuit having input and output connections, a source of operating potential for said amplifier, a potential divider connected between the terminals of said source and having a first intermediate terminal thereon connected to an output connection of said amplifier, two diodes connected in series between intermediate points on the portions of said potential divider which are on either side of said intermediate terminal, said diodes being poled for forward conduction of electric current in the same direction in their series connection, a feedback connection from a terminal which is common to said diodes to said input connection of said amplifier, a low-pass filter connected between the output of said amplifier and said feedback connection, and said filter being adapted to offer low attenuation to direct-current variations in said output circuit and a relatively high attenuation to instantaneous signal amplitude variations in said output circuit.

4. In an amplifier circuit wherein amplifier output signals tend to exhibit relatively low frequency variations in average signal amplitude and relatively high frequency variations in instantaneous signal amplitude, a source of operating potential for said amplifier, a potential dividing resistance connected across said source and having an intermediate terminal thereon connected to the output of said amplifier, said intermediate terminal dividing said resistance into two portions, means exclusive of said resistance coupling said operating potential source to said amplifier, two diodes connected in series between intermediate terminals on each of said resistance portions, a connection from a common terminal of said two diodes to the input of said amplifier, and a low-pass filter connected from the output of said amplifier to said common terminal.

5. An amplifier circuit for accomplishing limiting of both positive-going and negative-going excursions of an electric signal and for performing such limiting in a symmetrical manner with respect to the average value of said signal, said amplifier comprising a compounded amplifier circuit, input and output connections for said amplifier circuit, a source of operating potential connected to said amplifier circuit, a potential divider connected between the terminals of said source and having a first intermediate terminal thereon connected to said output connection of said amplifier, two diodes arranged in a series circuit between second and third intermediate terminals of said potential divider, a filter connected between said amplifier output connection and a terminal in said series circuit which is common to said diodes, said filter being adapted to transmit to said common terminal substantially only direct-current energy representing said average value, and means coupling said common terminal to said input connection of said amplifier circuit.

References Cited in the file of this patent

UNITED STATES PATENTS

| | | |
|---|---|---|
| 2,227,197 | Percival | Dec. 31, 1940 |
| 2,438,518 | Piety | Mar. 30, 1948 |
| 2,703,382 | Cleary | Mar. 1, 1955 |
| 3,036,224 | Abraham | May 22, 1962 |

FOREIGN PATENTS

| | | |
|---|---|---|
| 764,861 | Great Britain | Jan. 2, 1957 |